July 26, 1966 G. M. CONOVER 3,262,622
WIRE FEED DEVICE

Filed Sept. 3, 1964 2 Sheets-Sheet 1

INVENTOR.
George M. Conover
BY William S. Dorman
ATTORNEY

July 26, 1966  G. M. CONOVER  3,262,622
WIRE FEED DEVICE
Filed Sept. 3, 1964  2 Sheets-Sheet 2

INVENTOR.
George M. Conover
BY
William S. Dorman
ATTORNEY

United States Patent Office 3,262,622
Patented July 26, 1966

3,262,622
WIRE FEED DEVICE
George M. Conover, 725 Shawnee Ave., Bartlesville, Okla.
Filed Sept. 3, 1964, Ser. No. 394,232
13 Claims. (Cl. 226—127)

This invention relates to improvements in welding apparatus and more particularly, but not by way of limitation, to an improved feed device for directing a wire to a welding gun.

In certain types of welding, such as microwire, inert gas type welding, or semi-automatic type welding, a wire wound on a storage spool is fed to the welding gun as an electrode in lieu of the more conventional stick electrodes or welding rods. The wire is usually fed from the storage spool to the welding gun by means of a wire feed device interposed therebetween. The wire is usually propelled or moved through the feeding device by means of pressure urged rollers engaging opposite sides of the wire in order to pull the wire from the storage roller and force it through the feed device to the welding gun as the drive rollers are rotated. These devices have certain disadvantages in that the preessure exerted by the rollers may increase the load on the drive motor and cause an uneven or erratic movement of the wire. In addition, it is usually necessary to release the drive pressure of the rollers when the wire to be fed through the device is inserted therein. It will be apparent that this may alter the pressure adjustment of the rollers and as a result it is usually necessary to reset or readjust the pressure.

The present invention contemplates a novel wire feed device of a completely different concept wherein a stationary core member cooperates with a rotatable annular ring for pulling the wire from the storage spool and propelling the wire to the welding gun in an even and constant movement.

A spiral groove is provided on the outer periphery of the inner core member so arranged as to receive the wire from the storage roll adjacent one face of the core member and to eject the wire adjacent to opposite face thereof. The rotatable ring is disposed around the core member for propelling the wire through the groove and a pressure roller is provided for cooperation with the inner periphery of the rotatable ring to assure a substantially constant and even feeding of the wire from the storage roll through the feed device and to the welding gun.

It is an important object of this invention to provide a novel wire feed device for facilitating the feeding of a wire from a storage roll to a welding gun.

It is another object of this invention to provide a novel wire feed device for propelling a wire from a storage roll through a welding gun in a substantially constant and even movement during operation thereof.

Still another object of this invention is to provide a novel wire feed device wherein the movement of the wire being fed therethrough is guided to facilitate the smooth and even movement thereof.

A further object of this invention is to provide a novel wire feed device wherein the pressure adjustment of the drive means is substantially unaffected by insertion of the wire into the device.

A still further object of this invention is to provide a novel wire feed device which is simple and efficient in operation and economical and durable in construction.

Other and further objects and advantageous features of the present invention will hereinafter more fully appear in connection with a detailed description of the drawings in which.

Figure 1:
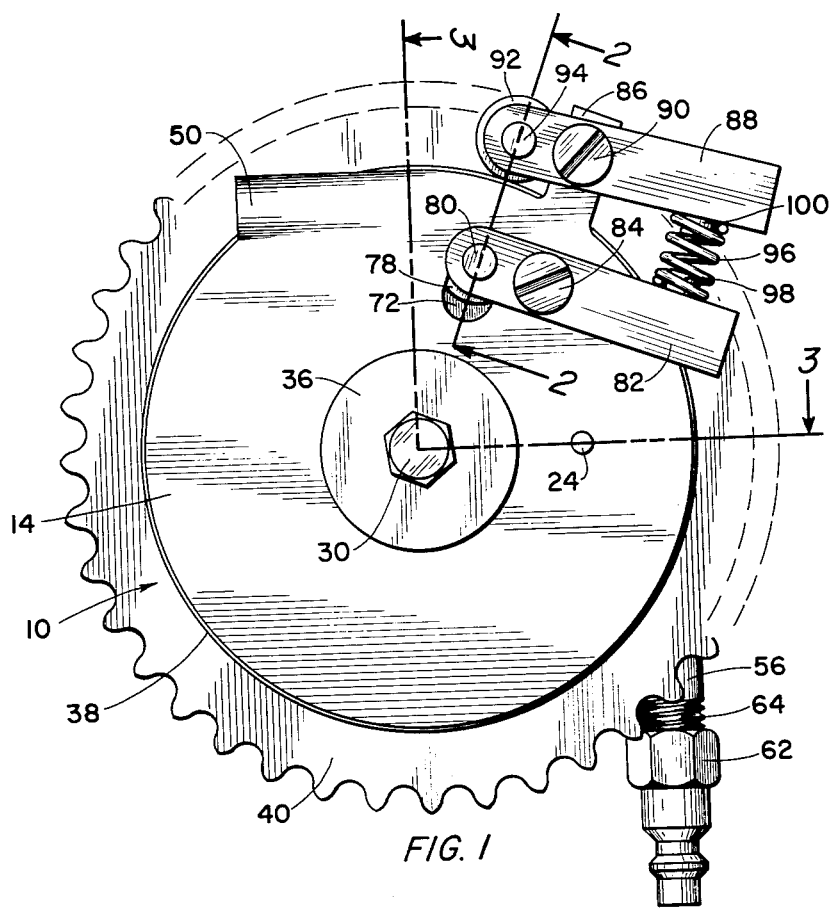
FIGURE 1 is a front elevational view of a wire feed embodying the invention.

Referring to the drawings in detail, reference character 10 generally indicates a wire feed device comprising a substantially circular central core portion 12 interposed between a front plate or disk 14 and a rear plate or disk 16. The rear plate 16 is removably secured to one face 18 of the core 12 by means of a plurality of spaced bolts or threaded stud members 20 in a manner as will be hereinafter set forth in detail.

A central boss or shank member 17 extends outwardly from the face 18 and through a central bore 19 provided in the rear plate 16 and facilitates installation of the device 10 for utilization in combination with the storage spool and welding gun.

The front plate 14 is disposed adjacent the opposite face 22 of the core 12 and is preferably oriented with respect thereto by a suitable indexing pin 24 which extends through an aperture 26 provided in the plate 14 and into a bore 28 provided in the core 12. Whereas the pin 24 as depicted herein is disposed in substantial alignment with one of the bolts 20, this is merely done for purposes of illustration and it is to be understood that the indexing pin 24 and aligned bores 26 and 28 may be at substantially any desired position in the core 12. The plate 14 is secured to the core 12 by means of a centrally disposed stud 30 which extends through a central aperture 32 provided in the plate 14 and into threaded engagement with a threaded bore 34 provided in the core 12. A suitable washer 36 cooperates with the stud 30 for securing the plate 14 to the bore 12 as is well known.

Figure 2:
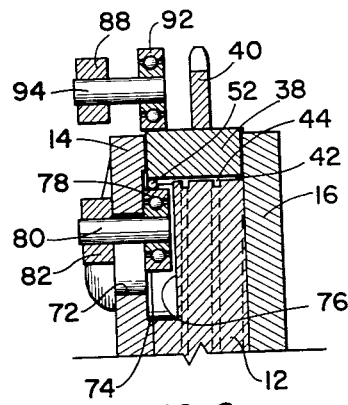
FIGURE 2 is a sectional view taken on line 2—2 of FIGURE 1.
Figure 3:
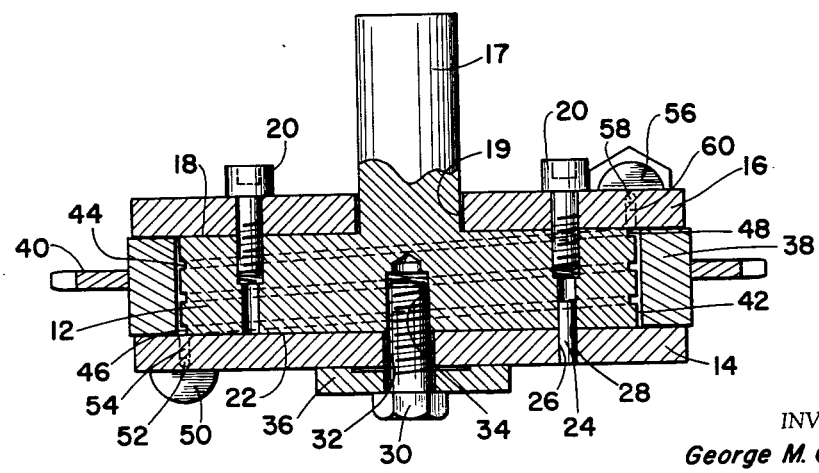
FIGURE 3 is a sectional view taken on line 3—3 of FIGURE 1.

The outer diameter of the core 12 is preferably smaller than the outer diameter of the plates 14 and 16 as clearly shown in FIGURES 2 and 3 and an annular ring 38 is rotatably disposed therearound between the plates 14 and 16. A gear or sprocket member 40 is rigidly secured in any suitable manner (not shown) to the outer periphery of the ring 38 and extends radially outwardly therefrom for a purpose as will be hereinafter set forth. An annular space 42 is provided between the outer periphery of the core member 12 and the inner periphery of the ring 38 and the width thereof is slightly exaggerated in the drawings for purposes of illustration. A spiral groove 44 is provided on the outer periphery of the core 12 for receiving the wire (not shown) therein. The groove 44 has one open end 46 provided on the face 22 and an opposite open end 48 terminating on the face 18, for a purpose as will be hereinafter set forth. Whereas the groove 44 as depicted in FIGURE 3 illustrates 3 wraps of the groove 44 around the core 22, it is to be understood that the angle of the spiral groove 44 may be substantially any pitch as desired whereby substantially any number of wraps may be provided throughout the length of the core 12.

A tangentially extending boss 50 (FIGURE 1) is provided on the outer periphery of the plate 14 and is provided with a centrally disposed internal bore 52 (FIGURE 3) extending therethrough into communication with an angular bore or recess 54 which is disposed in substantial alignment with the open end 46 of the spiral groove 44. A similar boss 56 extends tangentially from the outer periphery of the plate 16 and is provided with a central bore 58 extending therethrough into communication with an angular bore or recess 60 which is disposed in substantial alignment with the open end 48 of the spiral groove 44. The wire (not shown) to be utilized in the welding operation is directed from the storage spool (not shown) into the bore 52 of the first boss 50 and into the spiral groove 44. The wire will then be directed through the spiral groove 44 out the open end 48 thereof and into the second boss 56. A suitable nozzle 62 may be threadedly secured at 64 to the outer end of the boss 56 for receiving the wire therefrom and directing the wire to the welding gun.

The inner periphery of the rotatable ring 38 bears against the outer periphery of the wire being fed or propelled through the spiral groove 44 of the feed device 10 and the rotation of the ring 38 in combination with the stationary core 12 causes the wire to move through the spiral groove for discharge through the open end 48 thereof. The ring 38 may be rotated in any suitable manner and as depicted herein is rotated by the sprocket 40. The sprocket 40 may be engaged by a gear member (not shown) or a drive chain (not shown) which is activated by any suitable drive motor or power source (not shown) for driving or rotating the sprocket 40 which in turn transmits rotation to the ring 38.

Figure 5:
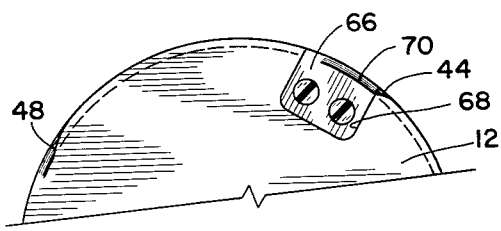
FIGURE 5 is a broken elevational view of a portion of the core member utilized in the novel feed device.
Figure 4:
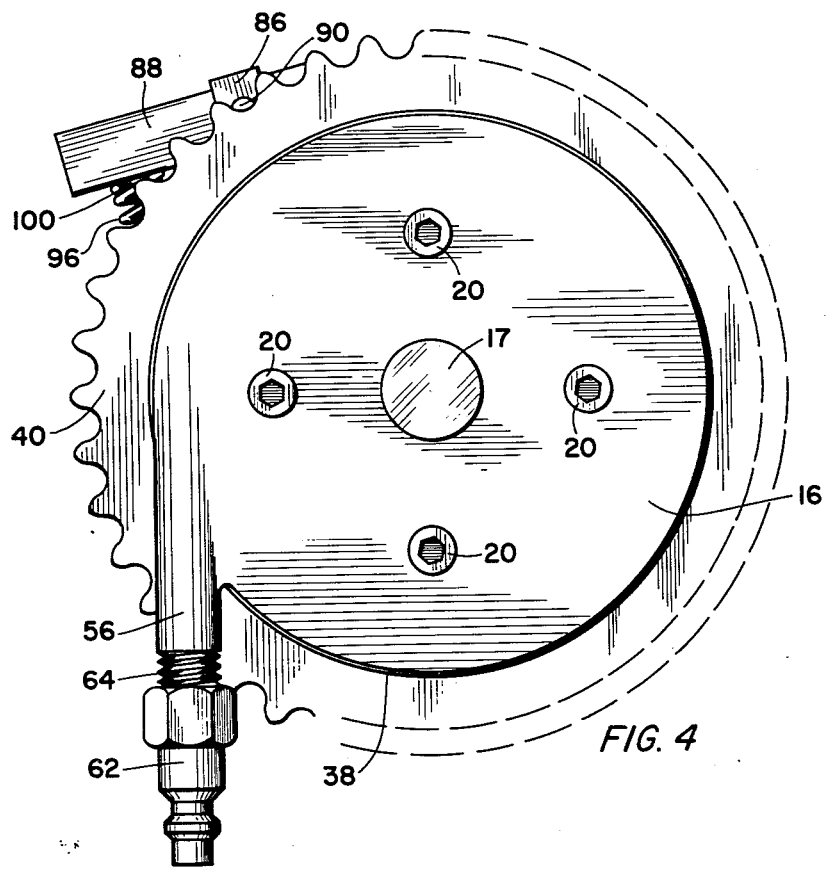
FIGURE 4 is a rear elevational view of a wire feed device embodying the invention.

Whereas the particular embodiment of the device 10 depicted in the drawings illustrates the boss 56 disposed in substantially perpendicular relationship with respect to the boss 50, it is to be understood that the bolts 20 are so disposed or spaced in the plate 16 in order to provide variable orientation of the angle between the bosses 50 and 56. For example, the plate 16 may be rotated in a clockwise direction as viewed in FIGURE 4 through a ninety degree angle of rotation and secured to the core 12 whereby the boss 56 will be substantially parallel with the boss 50 but having the open end thereof extending in an opposite direction from the open end of the boss 50. It will be apparent that such orientation of the plate 16 with respect to the core 12 will move the recess portion 60 out of alignment with the open end 48 of the groove 44. Thus, an adapter member 66 (FIGURE 5) may be removably secured in a recess 68 provided on the face 18 of the core 12 for diverting the path of the groove 44. The adapter 66 is provided with an angular cut-away portion 70 at the outer edge thereof which is in alignment with the portion of the groove 44 extending along the outer edge of the core 12 in the vicinity of the adapter 66. The angled portion 70 provides an end for the spiral groove 44 which is spaced from the end 48 and which is in alignment with the recess 60 in this newly orientated position of the plate 16.

An elongated bore or slot 72 (FIGURES 1 and 2) is provided in the front plate 14 and is disposed in the proximity of the juncture between the recess portion 54 and open end 46 of the groove 44. The bore 72 is enlarged at 74 and a complementary recess 76 is provided in the core 12 adjacent the bore 72 and enlarged portion 74 thereof. A suitable ball bearing roller 78 is slidably disposed within the complementary recesses 74 and 76 and is carried by a pin 80 which extends outwardly through the slot 72 as clearly shown in FIGURE 2. The pin 80 is rigidly secured to an arm 82 which is pivotally secured on the exposed surface of the plate 14 in any suitable manner such as by the threaded member 84. A boss member 86 extends substantially radially outwardly from the outer periphery of the plate 14 and is disposed in the proximity of the arm 82. A second arm 88 is pivotally secured to the boss 86 in any suitable manner, such as by the stud member 90, and a second ball bearing roller member 92 is journalled on a pin 94 carried by the arm 88. A suitable helical spring member 96 is disposed between the outer ends of the arms 82 and 88 opposite from the rollers 78 and 92 and is preferably positioned around complementary guide pins 98 and 100. The guide pins 98 and 100 retain the spring 96 in position between the arms 82 and 88 for constantly urging the outer ends of the arms in a direction away from each other whereby the rollers 92 and 78 are constantly urged in a direction toward each other. The roller 92 is thus urged against the outer periphery of the ring 38 and the roller 78 is constantly urged in a direction toward the inner periphery thereof. As the wire (not shown) is fed into the apertured boss 50 through a sufficient distance the roller 78 will engage the wire and hold it firmly against the inner periphery of the rotatable ring 38, thus assuring that the wire will be moved through the spiral groove 44 and in a direction toward the open end 48 thereof in an even and constant movement.

*Operation*

When it is desired to feed a wire (not shown) from a storage roll (not shown) to a welding gun (not shown) the wire feed device 10 may be interposed therebetween in any well known manner (not shown) whereby the wire from the spool may be inserted into the bore 52 of the boss 50. The sprocket or gear 40 is rotated in any suitable manner (not shown) for rotating the ring 38 with respect to the stationary core 12. When the wire has been inserted into the boss 50 through a sufficient distance, the roller 78 will engage the wire and urge the wire into a tight engagement with the inner periphery of the ring 38. As the ring 38 is rotated by the gear 40 the pressure of the roller urging the wire against the ring 38 will pull the wire from the spool and feed the wire through the spiral groove 44. Continued rotation of the ring 38 will propell the wire through the groove 44 and out the open end 48 thereof for discharge through the aperture 58 of the boss 60. The fitting 62 receives the wire from the boss 56 and directs the same to the welding gun in any well known manner (not shown).

As hereinbefore set forth, the relative angular position between the bosses 50 and 56 may be varied as desired or in accordance with the particular installation wherein the device 10 is to be utilized. When the angle between the bosses 50 and 56 is substantially ninety degrees as depicted in the drawings, the open end 48 of the groove 44 will be in alignment with the recess portion 60 and groove 58 of the boss 56. However, when the boss 56 is in some other relative angular position with respect to the boss 50, the adapter insert 66 may be utilized for changing the position of the open end of the groove 44. This feature provides for a versatile or substantially universal installation for the wire feed apparatus 10.

From the foregoing it will be apparent that the present invention contemplates a novel wire feed device wherein a stationary central core cooperates with a rotatable annular ring for efficiently feeding or propelling a wire from a storage spool to a welding gun. A spiral groove is provided on the outer periphery of the stationary core for guiding the movement of the wire through the device and spring urged roller means cooperating with the rotatable ring for efficiently urging or driving the wire through the spiral groove in a smooth and constant path of travel. The novel wire feed device is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims, without departing from the spirit of the invention.

What is claimed is:

1. A wire feed device for directing a wire to a welding gun and comprising a stationary member, a rotatable member journalled around the stationary member, guide means provided on the stationary member for receiving the wire therein, and roller means cooperating with the rotatable member whereby the wire is engaged therebetween for moving the wire through the guide means in a constant and even movement for directing the wire to the welding gun.

2. A wire feed device for directing a wire to a welding gun and comprising a centrally disposed stationary core member, an annular ring rotatably disposed around the core member, guide means interposed between the core member and the ring for receiving the wire therein, and roller means cooperating with the ring whereby the wire is engaged therebetween for propelling the wire through the guide means for directing the wire to the welding gun.

3. A wire feed device for directing a wire to a welding gun and comprising a stationary core member, guide means provided on the outer periphery of the core member for receiving the wire therein, an annular ring rotatably disposed around the core member and engageable with the wire for moving the wire through the guide means, means for directing the wire to the guide means, roller means cooperating with the rotatable ring for moving the wire through the guide means in an even and constant movement, and means for receiving the wire from the guide means for directing the wire to the welding gun.

4. A wire feed device for directing a wire to a welding gun and comprising a central stationary core member, an annular ring rotatably disposed around the core member, a spiral passageway interposed between the core member and rotatable ring for receiving the wire therein, and roller means cooperating with the rotatable ring whereby the wire is pressure engaged between the ring and roller means for moving the wire through the spiral groove in an even and constant path of movement for directing the wire to the welding gun.

5. A wire feed device for directing a wire to a welding gun and comprising a stationary core member, a spiral groove provided on the outer periphery of the core member for receiving the wire therein, said groove having one end thereof open at one face of the core member and the opposite end thereof open at the opposite face of the core member, an annular ring member rotatably disposed around the core and engageable with the wire for moving the wire through the spiral groove, and roller means cooperating with the rotatable ring for moving the wire through the groove in an even and constant movement for directing the wire to the welding gun.

6. A wire feed device for directing a wire to a welding gun and comprising a stationary core member, a spiral groove provided on the outer periphery of the core member for receiving the wire therein and guiding the path of the wire from one side of the core member to the opposite side thereof, an annular ring rotatably disposed around the outer periphery of the core member and engageable with the wire for propelling the wire through the spiral groove, roller means cooperating with the rotatable ring for moving the wire through the groove in an even and constant movement, means for directing the wire into the spiral groove, and means for receiving the wire from the spiral groove for directing the wire to the welding gun.

7. A wire feed device for directing a wire to a welding gun and comprising a stationary core member, a spiral groove provided on the outer periphery of the core member for receiving the wire therein, said groove having one end open at one side of the core member and the opposite end thereof open at the opposite side of the core member for guiding the movement of the wire from one side of the core member to the opposite thereof, rotatable means cooperating with the stationary core member for moving the wire through the groove in an even and constant movement, and means for varying the position of at least one open end of the groove to provide for variable orientations of the feed device with respect to the welding gun.

8. A wire feed device comprising a stationary core member, a spiral groove provided on the outer periphery of the core member for receiving a wire therein, said spiral groove having one end thereof open at one face of the core member and the other end thereof open at the opposite face of the core member whereby the wire will be guided from the said one face to the other, an annular ring rotatably disposed around the core member for engaging the wire disposed within the groove and moving the wire therethrough, and roller means cooperating with the rotatable ring for moving the wire through the groove in an even and constant movement.

9. A wire feed device as set forth in claim 8 and including adapter means removably securable to one face of the core member for varying the position of the associate open end of the groove whereby orientation of installation is provided for the feed device.

10. A wire feed device for directing a wire to a welding gun, and comprising a stationary core member, a spiral groove provided on the outer periphery of the core member for receiving the wire therein, said groove having a first end thereof open at one face of the core member and a second end thereof open at the opposite face of the core member whereby the wire will be guided from the said one face to the other, an annular ring rotatably disposed around the core member for engaging the wire disposed within the groove and moving the wire therethrough, means secured to one face of the core member for directing the wire into the first open end of the groove, roller means disposed in the proximity of the first open end of the groove for cooperating with the rotatable ring to move the wire through the groove in an even and constant movement, and means secured to the said opposite face of the groove for receiving the wire from the said second end of the groove for directing the wire to the welding gun.

11. A wire feed device as set forth in claim 10 and including a removable adapter member for varying the position of one open end of the spiral groove to provide for variable orientation of the feed device with respect to the welding gun.

12. A wire feed device for directing a wire to a welding gun, and comprising a stationary core member, a spiral groove provided on the outer periphery of the core member for receiving the wire therein, said groove having a first end open at one face of the core member and a second end open at the opposite face of the core member whereby the wire will be guided from the said one face to the other, an annular ring rotatably disposed around the core member for engaging the wire disposed within the groove and moving the wire therethrough, first plate means removably secured to one face of the core member, passageway means provided in the first plate means for directing the wire into the said first open end of the groove, spring urged roller means carried by the first plate and disposed in the proximity of said first open end of the groove for cooperation with the rotatable ring for moving the wire through the spiral groove in an even and constant movement, second plate means removably secured to the opposite face of the core member, and passageway means provided in said second plate means for receiving the wire from the said second open end of the groove for directing the wire to the welding gun.

13. A wire feed device as set forth in claim 12 including adapter means removably secured to one of said faces of said core member for varying the position of the respective open end of the groove to permit variable orientation of the feed device with respect to the welding gun.

References Cited by the Examiner

UNITED STATES PATENTS

| 1,152,043 | 8/1915 | Orme | 228—52 |
| 2,797,293 | 6/1957 | Weber | 228—52 |
| 2,944,584 | 7/1960 | Calmy | 153—66 |
| 3,150,841 | 9/1964 | Stevens | 242—55.19 |

M. HENSON WOOD, JR., *Primary Examiner.*

J. N. Erlich, *Assistant Examiner.*